(12) United States Patent
Izenberg et al.

(10) Patent No.: US 8,588,242 B1
(45) Date of Patent: Nov. 19, 2013

(54) DEFICIT ROUND ROBIN SCHEDULING USING MULTIPLICATION FACTORS

(75) Inventors: Erez Izenberg, Tel Aviv (IL); Ruven Torok, Tel Aviv (IL); Erez Amit, Rehovot (IL); Dimitry Melts, Tel Aviv (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 305 days.

(21) Appl. No.: 12/984,442

(22) Filed: Jan. 4, 2011

Related U.S. Application Data

(60) Provisional application No. 61/293,120, filed on Jan. 7, 2010.

(51) Int. Cl.
*H04L 12/28* (2006.01)

(52) U.S. Cl.
USPC ........ 370/412; 370/235; 370/395.41; 710/52; 710/111

(58) Field of Classification Search
USPC ........ 370/412, 395.4, 395.41, 395.42, 395.43
See application file for complete search history.

(56) References Cited

U.S. PATENT DOCUMENTS

2009/0168790 A1* 7/2009 Lee .............................. 370/412

* cited by examiner

*Primary Examiner* — Nicholas Sloms

(57) ABSTRACT

Some of the embodiments of the present disclosure provide a method for scheduling processing of packets received from a network, comprising assigning a corresponding queue weight to each of a plurality of queues that are configured to enqueue the packets for processing; for each of the plurality of queues, determining a corresponding multiplication factor (MF) as a function of a number of cycles until a next packet is available from the corresponding queue for processing; and incrementing a plurality of counters, associated with the corresponding plurality of queues, based at least in part on the multiplication factors. Other embodiments are also described and claimed.

15 Claims, 4 Drawing Sheets

| DDR cycle (i-1) | DDR cycle (i) |
|---|---|
| | MFa = 15,<br>MFb = 10,<br>MFe = -,<br>MMF = 10,<br>IFa = 1000,<br>IFb = 1500,<br>IFe = 0,<br><br>Queue Counter Ca = 0 + 1000 = 1000,<br>Queue Counter Cb = 0 + 1500 = 1500,<br>Queue Counter Ce = 0+0 = 0,<br><br>As Cb is high enough to transmit head data packet Db1, data packet Db1 is processed,<br><br>Queue Counter Ca = 1000,<br>Queue counter Cb is updated as Cb = 1500 – 1500 = 0, and<br>Queue counter Ce = 0. |
| Queue counter Ca = 0<br>Queue counter Cb = 0<br>Queue counter Ce = 0 | |

Queue A (Queue weight Wa = 100)

| Da3<br>Packet<br>size 1000 | Da2<br>Packet<br>size 1000 | Da1<br>Packet size 1500<br>(i.e., Psa = 1500) |
|---|---|---|

Queue B (Queue weight Wb = 150)

| Db2<br>Packet<br>size 1100 | Db1<br>Packet size 1500<br>(i.e., PSb = 1500) |
|---|---|

Queue E (Queue weight Wb = 250, although no data packets in the queue)

Fig. 2a

| DDR cycle (i+1) |
|---|
| MFa = 5,<br>MFb = 8,<br>MFe = -,<br>MMF = 5,<br>IFa = 500,<br>IFb = 750,<br>IFe = 0,<br><br>Queue Counter Ca = 1000 + 500 = 1500,<br>Queue Counter Cb = 0 + 750 = 750,<br>Queue Counter Ce = 0,<br><br>As Ca is high enough to transmit head data packet Da1, data packet Db1 is processed,<br><br>Queue counter Ca is updated as Ca = 1500 − 1500 = 0,<br>Queue counter Cb = 750, and<br>Queue counter Ce = 0. |

Queue A (Queue weight Wa = 100)

| Da3<br>Packet<br>size 1000 | Da2<br>Packet<br>size 1000 | Da1<br>Packet size 1500<br>(i.e., Psa = 1500) |
|---|---|---|

Queue B (Queue weight Wb = 150)

| Db2<br>Packet size 1100<br>(i.e., PSb = 1100) |
|---|

Queue E (Queue weight Wb = 250, although no data packets in the queue)

Fig. 2b

DEFICIT ROUND ROBIN SCHEDULING USING MULTIPLICATION FACTORS

CROSS REFERENCE TO RELATED APPLICATIONS

The present application claims priority to U.S. Patent Application No. 61/293,120, filed Jan. 7, 2010, the entire specification of which is hereby incorporated by reference in its entirety for all purposes, except for those sections, if any, that are inconsistent with this specification.

TECHNICAL FIELD

Embodiments of the present disclosure relate to deficit round robin scheduling in general, and more specifically, to deficit round robin scheduling of data packets using multiplication factors.

BACKGROUND

Unless otherwise indicated herein, the approaches described in this section are not prior art to the claims in the present disclosure and are not admitted to be prior art by inclusion in this section.

In a conventional deficit round robin (DRR) scheduling, a packet processor processes data packets from a plurality of traffic flows or queues. Each queue is assigned a corresponding weight based on, for example, a priority of the queue. In each DRR cycle, a counter associated with a queue is incremented by the assigned weight of the queue. During a DRR cycle, a size of a packet to be processed from a queue is compared with the associated counter. If the size of the packet in the queue is greater than the associated counter, the packet is not processed in that DRR cycle (e.g., the processing of the packet is carried forward for a future DRR cycle). However, if the counter is at least as high as the size of the packet, the packet is processed during the DRR cycle and the counter is updated by subtracting the packet size from the previous counter value.

If the sizes of the packets in the queues are relatively large compared to the respective weights of the queues, in a conventional DRR scheduling, no packets may be processed during several DRR cycles. That is, several DRR cycles are wasted (e.g., wasted as no packet processing occurs during these DRR cycles), as the counters are not high enough to allow processing of the data packets. These wasted DRR cycles in a conventional packet processing system generally results in performance degradation of the system.

SUMMARY

In various embodiments, the present disclosure provides a method for scheduling processing of packets received from a network, comprising assigning a corresponding queue weight to each of a plurality of queues that are configured to enqueue the packets for processing; for each of the plurality of queues, determining a corresponding multiplication factor (MF) as a function of a number of cycles until a next packet is available from the corresponding queue for processing; and incrementing a plurality of counters, associated with the corresponding plurality of queues, based at least in part on the multiplication factors. There is also provided a system-on-chip (SOC) comprising a plurality of client devices associated with a corresponding plurality of queues, wherein the plurality of queues is assigned a corresponding plurality of counters; and a packet processor comprising a weight assignment module configured to assign, to the plurality of queues, a corresponding plurality of queue weights; a queue multiplication factor module configured to determine, for the plurality of queues, a corresponding plurality of multiplication factors (MFs), wherein a MF of a queue is a function of a number of cycles until a next packet is available from the corresponding queue for processing; a queue counter module configured to increment each of the plurality of counters based at least in part on the plurality of MFs. There is also provided a method comprising determining a first multiplication factor (MF) associated with a first queue, wherein the first MF represents a minimum number of deficit round robin (DRR) cycles required by the first counter to reach a first threshold value if the first counter is incremented by a first queue weight during a DRR cycle; determining a second MF associated with a second queue, wherein the second MF represents a minimum number of DRR cycles required by the second counter to reach a second threshold value if the second counter is incremented by the second queue weight during a DRR cycle; determining a third MF that is a minimum of the first MF and the second MF; incrementing a first counter, associated with the first queue, by a product of the first queue weight and the third MF; and incrementing a second counter, associated with the second queue, by a product of the second queue weight and the third MF.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIGS. 2a and 2b schematically illustrate operations of the packet processing system of FIG. 1, in accordance with an embodiment of the present disclosure.

DETAILED DESCRIPTION

Figure 1:
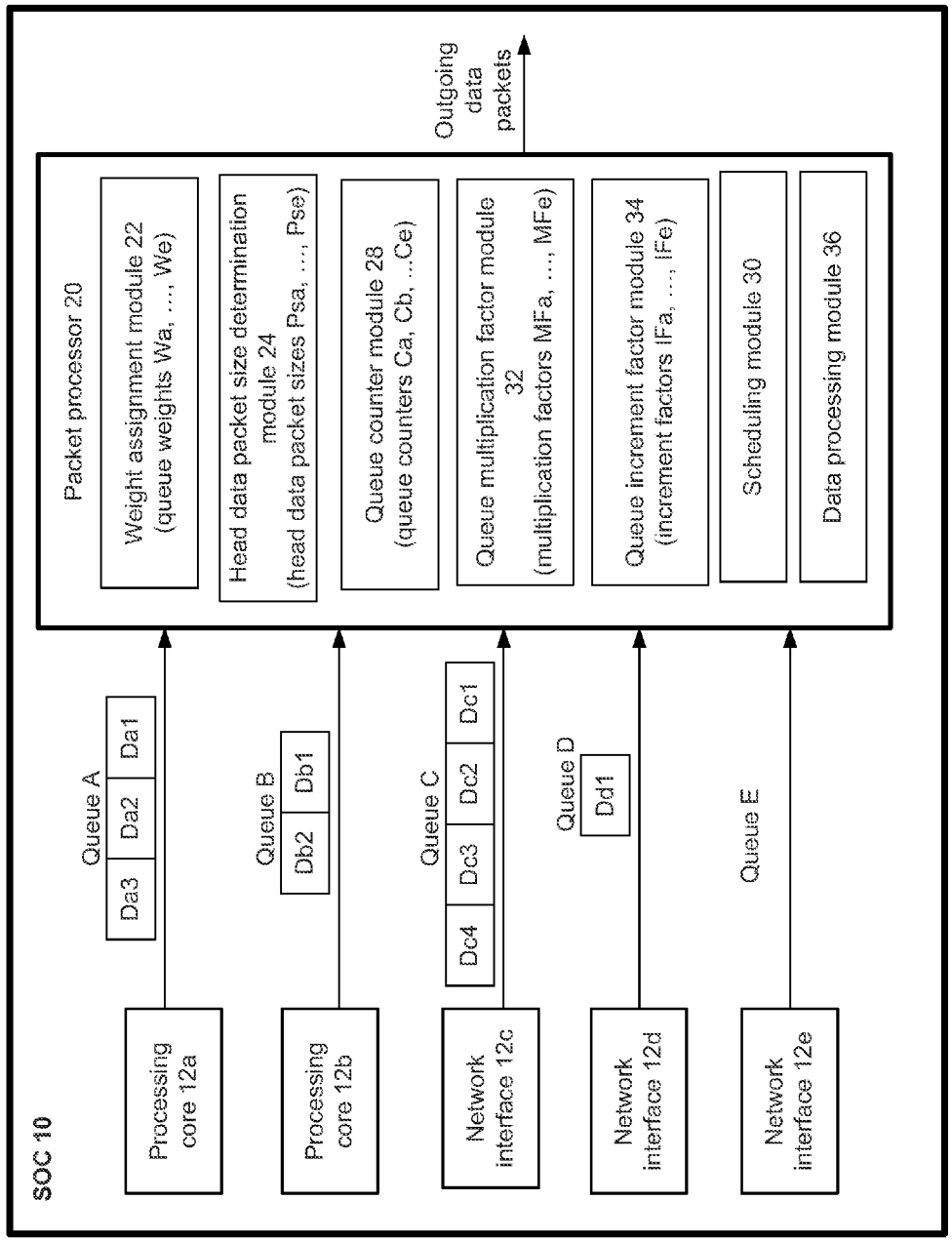
FIG. 1 schematically illustrates a packet processing system that includes a system-on-chip comprising a queue multiplication factor module, in accordance with an embodiment of the present disclosure.

FIG. 1 schematically illustrates a packet processing system 100 (also referred to herein as system 100) that includes a system-on-chip (SOC) 10 comprising a queue multiplication factor module 32, in accordance with an embodiment of the present disclosure. The SOC 10 includes a packet processor 20 comprising the queue multiplication factor module 32. The SOC 10 also includes one or more processing cores, e.g. processing core 12a and processing core 12b. The SOC 10 further includes one or more network interfaces, e.g., network interfaces 12c, ..., 12e. In an embodiment, network interfaces 12c, ..., 12e are network devices, e.g., a network switch, a network router, a network port, an Ethernet port (e.g., a Gigabyte or other suitable sized Ethernet port), a network controller, any appropriate device that has a network connectivity, and/or the like.

Although not illustrated in FIG. 1, in an embodiment, one or more of the processing cores 12a and 12b and network interfaces 12b, ..., 12e are external to the SOC 10, although such architecture is optional. Although the SOC 10 includes several other components (e.g., one or more peripherals, one or more serializer and/or deserializer (SerDes) devices, interfaces, communication bus, cache, and/or the like), these components are not illustrated in FIG. 1 for the purpose of illustrative clarity. Although two processing cores and three network interfaces are illustrated in FIG. 1, the SOC 10 may include any other suitable number of processing cores and/or network interfaces.

In an embodiment, the processing cores 12a and 12b and the network interfaces 12c, ..., 12e transmit data packets to the packet processor 20. Data packets (also referred to herein as "packets") herein refer to packets that include user data, control data, management data, and/or any other appropriate information. As the packet processor 20 provides service to the processing cores 12a and 12b and the network interfaces 12c, ..., 12e, the processing cores 12a and 12b and the network interfaces 12c, ..., 12e are also referred to herein as client devices of the packet processor 20. The packet processor 20 receives data packets from one or more of the processing cores 12a and 12b and the network interfaces 12c, ..., 12e, and processes the received data packets. In a simple example, the packet processor 20 sequentially receives data packets from one or more client devices (the sequence in which the data packets are received from one or more client devices will be discussed in more detail herein later), and re-transmits the received data packets (illustrated as outgoing data packets in FIG. 1) to one or more components that are either external to, or included in the SOC 10. In an embodiment, the packet processor 20 processes the data packets received from the client devices, before transmitting the processed data packets as outgoing data packets.

In an embodiment, data packets from a client device are queued before being transmitted to the packet processor 20. A queue associated with a client device may form within the client device, and/or may form in any appropriate memory or buffer (e.g., a first-in first-out buffer, not illustrated in FIG. 1) associated with the client device. For example, data packets to be transmitted from the processing core 12a to the packet processor 20 are queued as queue A, data packets to be transmitted from the processing core 12b to the packet processor 20 are queued as queue B, data packets to be transmitted from the network interface 12c to the packet processor 20 are queued as queue C, data packets to be transmitted from the network interface 12d to the packet processor 20 are queued as queue D, and data packets to be transmitted from the network interface 12e to the packet processor 20 are queued as queue E, as illustrated in FIG. 1.

Although FIG. 1 illustrates only one queue from a client device to the packet processor 20, this does not in any way limit the teachings of this disclosure. Although not illustrated in FIG. 1, in an embodiment, more than one queue is formed from a client device to the packet processor 20. For example, relatively high priority data packets of a client device are queued in a queue, whereas relatively low priority data packets of the client device are queued in another queue. Although not illustrated in FIG. 1, in an embodiment, a queue receives data packets from more than one client devices. As an example, although not illustrated in FIG. 1, a queue receives data packets from processing core 12a and network interface 12c.

FIG. 1 also illustrates example data packets in the queues A, ..., E at a given time. For example, queue A includes data packets Da1, Da2 and Da3, queue B includes data packets Db1 and Db2, queue C includes data packets Dc1, Dc2, Dc3 and Dc4, queue D includes only one data packet (e.g., data packet Dd1), and queue E does not include any data packet.

In an embodiment, data packets from various queues are processed by the packet processor 20 using deficit round robin (DRR) scheduling. In an embodiment, during a DRR cycle, a scheduling module 30 included in the packet processor 20 schedules a data packet, from a queue of the queues A, ..., E, for processing by the packet processor 20, as will be discussed in more detail herein later.

In an embodiment, individual queues operate on a first-in first-out basis. For example, for queue A, data packet Da1 is processed by the packet processor 20, followed by data packets Da2 and Da3 (although one or more other data packets from other queues may be processed in between processing the data packets of the queue A).

Referring again to FIG. 1, the packet processor 20 comprises a weight assignment module 22. In an embodiment, the weight assignment module 22 is configured to assign queue weights to a queue based, for example, on a priority of the data packets associated with the queue, an originating address of the queue, a destination address of the queue, etc. For example, a queue weight of a queue is a number that represents a relative priority of the queue compared to priorities of other queues. As an example, if the priority of the data packets of queue A is relatively higher than that of queue B, the queue weight assigned to queue A is relatively higher than that of queue B. As an example, if packets in queue A have a higher processing priority than packets in queue B, then queue A is assigned a queue weight of Wa, queue B is assigned a queue weight of Wb, where Wa>Wb, and so on.

Although the weight assignment module 22 is illustrated to be included in the packet processor 20, in an embodiment, the weight assignment module 22 is external to the SOC 10. In an embodiment, the assigned queue weights Wa, ..., We are configurable and/or are assigned by a user of the SOC 10.

For the purpose of this disclosure and unless otherwise mentioned, a data packet at a head of a queue is referred to herein as a head data packet of the queue. Thus, the head data packet of the queue is the first data packet of the queue that is to be processed by the packet processor 20. For example, data packet Da1 is the head data packet of the queue A, data packet Db1 is the head data packet of the queue B, and so on. In FIG. 1, the queue E is empty. Accordingly, queue E does not have any head data packet.

The packet processor 20 also comprises a head data packet size determination module 24, which is configured to determine packet sizes of head data packets of various queues. In an embodiment, a packet size is expressed using any appropriate packet size measurement units, e.g., bits, bytes, etc. For example, the size of the head data packet Da1 of the queue A is PSa (e.g., which is a function of a number of bytes included in the head data packet Da1), the size of the head data packet Db1 of the queue B is PSb, and so on. In an embodiment, the head data packet size determination module 24 determines the size of the head data packet of a queue based on one or more parameters received from the queue (e.g., from a header portion of the head data packet received from the queue).

In an embodiment, the queues A, ..., E are assigned queue counters Ca, ..., Ce, respectively. For example, queue A is assigned a queue counter Ca, queue B is assigned a queue counter Cb, and so on. The packet processor 20 also comprises a queue counter module 28, which keeps track of the queue counters Ca, ..., Ce, and periodically updates the queue counters.

In an embodiment, the packet processor 20 schedules processing of data packets from one or more of the queues A, . . . , E using DRR scheduling. The DRR scheduling comprises a plurality of DRR cycles. During each DRR cycle, the scheduling module 30 schedules a data packet (e.g., a head data packet from a selected queue of the queues A, . . . , E) for processing by the packet processor 20 (e.g., by a data processing module 36 included in the packet processor 20).

The packet processor 20 also comprises a queue increment factor (IF) module 34 configured to determine increment factors IFa, . . . , IFe for queues A, . . . E, respectively, as will be discussed in more detail herein later. In an embodiment, in each DRR cycle, the queue counters Ca, . . . , Ce are incremented (e.g., by the queue counter module 28) by corresponding increment factors IFa, . . . , IFe, respectively. For example, during a DRR cycle, the queue counter Ca is incremented by increment factor IFa, the queue counter Cb is incremented by increment factor IFb, and so on.

During each DRR cycle, in an embodiment, after incrementing the queue counters Ca, . . . , Ce, the queue counter of a queue is compared to the size of the head data packet of the queue. If the size of the head data packet of the queue is greater than the associated queue counter, the packet is not scheduled (e.g., by the scheduling module 30) for processing in that DRR cycle (e.g., the processing of the packet is carried forward for a future DRR cycle). However, if the queue counter value is at least as high as the size of the head data packet, the head data packet is scheduled (e.g., by the scheduling module 30) for processing (e.g., by the data processing module 36) during the DRR cycle and the queue counter is updated by subtracting the size of the head data packet from the queue counter.

In a conventional packet processing system implementing a conventional DRR scheduling, if the sizes of the head data packets of the queues are relatively large compared to the respective queue weights of the queues, during several DRR cycles no data packets may be processed at all (e.g., the queue counters of each queue may be lower than the size of the corresponding head packets during these DRR cycles). That is, several DRR cycles are wasted (e.g., wasted as no data packet processing occurs during these DRR cycles), as the queue counters of the conventional packet processing system are not high enough to allow transmission of head data packets. To overcome these issues of the conventional packet processing system, in an embodiment, the packet processor 20 of FIG. 1 increments, during one or more DRR cycles, the queue counters by increment factors that are greater than the corresponding queue weights, as will be discussed in more detail herein later.

In an embodiment, the packet processor 20 also comprises a queue multiplication factor module 32, which is configured to determine, for each DRR cycle, a plurality of multiplication factors (MFs) for the corresponding plurality of queues. For example, during a DRR cycle, the queue multiplication factor module 32 determines MFa associated with queue A, MFb associated with queue B, and so on. In an embodiment, an MF of a queue (e.g., MFa of queue A) represents a minimum number of DRR cycles required to increment the queue counter by the corresponding queue weight such that the queue counter value is high enough to allow transmission of the head data packet in the queue. For example, if the queue counter Ca is incremented by queue weight Wa in each DRR cycle, then MFa represents the minimum number of DRR cycles required to increment the queue counter Ca by the queue weight Wa such that the queue counter Ca is at least as high as PSa (i.e., is at least as high as the size of the head data packet Da1 in the queue A). For an $i^t$ queue (where i=A, . . . , E) with queue counter $C_i$, queue weight $W_i$ and head data packet size $PS_i$, $MF_i$ is determined as $$MF_i = \text{Ceiling}((PS_i - C_i)/W_i), \quad \text{Equation (1)}$$

where the function Ceiling(M) of a number M represents the smallest integer that is not smaller than M. For example, if M=3.2, then ceiling(M) is 4. In a simple example, if PSa is 1000, queue weight Wa is 150 and the queue counter Ca is 350, then MFa is 5. In an embodiment, multiplication factor for empty queues (i.e., those queues which do not currently include any data packet, e.g., queue E) is undefined.

For each DRR cycle, the queue multiplication factor module 32 also determines a minimum multiplication factor (MMF), which is a minimum of the MFs of all the queues. For example, for each DRR cycle, $$MMF = \text{minimum}(MFa, \ldots, MFe). \quad \text{Equation (2)}$$

In an embodiment, multiplication factor for empty queues are not taken into account while determining the MMF (e.g., in such a case, MMF=minimum(MFa, . . . , MFd), as queue E is empty).

As previously discussed, at the beginning of each DRR cycle, the queue counter module 28 increments the queue counters Ca, . . . , Ce by increment factors IFa, . . . , IFe, respectively. In an embodiment, the increment factors IFa, . . . , IFe are products of respective queue weights and the MMF. For example, IFa is a product of Wa and MMF (i.e., IFa=Wa×MMF), IFb is a product of Wb and MMF (i.e., IFb=Wb×MMF), and so on. Thus, for the $i^{th}$ queue, $$IF_i = W_i \times MMF. \quad \text{Equation (3)}$$

As previously discussed, once the queue counters are updated using the respective increment factors, the queue counter of a queue is compared to the packet size of the head data packet of the queue. If the packet size of the head data packet of the queue is greater than the associated queue counter, the packet is not scheduled for processing (e.g., by the scheduling module 30) in that DRR cycle. However, if the queue counter value is at least as high as the size of the head data packet, the head data packet is scheduled (e.g., by the scheduling module 30) for processing by the packet processor 20 during the DRR cycle and the queue counter is updated (e.g., by the queue counter module 28) by subtracting the size of the head data packet from the queue counter. The head data packet, scheduled for processing, is subsequently processed by the data processing module 36 included in the packet processor 20.

In a conventional packet processing system implementing a conventional DRR scheduling, during each DRR cycle the queue counters are generally incremented by the assigned queue weights. For example, if a queue weight assigned to a queue is 100, then the associated queue counter of the conventional packet processing system is incremented by 100 during each DRR cycle. Subsequently, the queue counter is compared to the packet size of the head data packet of the queue to determine if the head data packet is to be processed during the current DRR cycle. If the sizes of the head data packets of the queues are relatively large compared to the respective queue weights of the queues, in a conventional DRR scheduling, during several DRR cycles no data packets may be processed at all. That is, several DRR cycles are wasted (e.g., wasted as no data packet processing occurs during these DRR cycles), as the queue counters are not high enough to allow transmission of head data packets. These wasted DRR cycles in a conventional packet processing system generally results in performance degradation (e.g., results in relatively higher latency) of the conventional packet processing system.

In contrast, in the packet processing system 10 of FIG. 1, due to the introduction of the MFs and the MMF, the queue counters Ca, . . . , Ce are updated by the corresponding increment factors such that no DRR cycles are wasted (i.e., processing of head data packets occur in each DRR cycle when such head data packets are available for processing in one or more queues). For example, the MFs and MMF ensure that the queue counters are updated using the increment factors IFa, . . . , IFe such that for at least one queue of the queues A, . . . , E, the queue counter is high enough to allow transmission of a head data packet in each DRR cycle. Accordingly, the packet processing system of FIG. 1 has better performance (e.g., due to less or no wastage of DRR cycles) compared to the previously discussed conventional packet processing system.

FIGS. 2a and 2b schematically illustrate operations of the packet processing system 10 of FIG. 1, in accordance with an embodiment of the present disclosure. In FIGS. 2a and 2b, as an example, the operation of the packet processing system 10 is illustrated using only three queues (queues A, B and E), although the teachings of this disclosure is not limited by such a number of queues.

As illustrated in FIGS. 1 and 2a, at the end of a DRR cycle (i−1), queue A has three data packets Da1, Da2 and Da3, with Da1 being the head data packet. Also, data packets Da1, Da2 and Da3 are equal to example sizes 1500, 1000, and 1000, respectively. Thus, the size of the head data packet of queue A is 1500 (i.e., PSa=1500). Similarly, queue B has two data packets Db1 and Db2 at the end of the DRR cycle (i−1), with Db1 being the head data packet. Also, data packets Db1 and Db2 are equal to example sizes of 1500 and 1100, respectively (i.e., PSb=1500). Queue E has no data packet at the end of the DRR cycle (i−1) (i.e., size of the head data packet PSe=0). Queue weights Wa, Wb and We are assumed to be equal to example values 100, 150 and 250, respectively. Also, at the end of the DRR cycle (i−1), the queue counters Ca, Cb and Ce are all equal to examples value of 0.

At DRR cycle (i) (which occurs immediately subsequent to the DRR cycle (i−1)), MFa, MFb and MFc are determined using equation 1. For example, MFa=Ceiling ((PSa−Ca)/Wa)= Ceiling ((1500−0)/100)=15. MFb is similarly determined to be equal to 10. As the queue E is empty, MF for queue E (i.e., MFe) is undefined. The MMF for the DRR cycle (i) is determined using equation 2, and the MMF is equal to the minimum of MFa and MFb. That is, the MMF for the DRR cycle (i) is equal to 10.

Increment factors IFa, IFb and IFe are subsequently determined using equation 3. For example, IFa=MMF×Wa=10× 100=1000. Similarly, IFb is equal to 1500 and IFe is equal to zero, as illustrated in FIG. 2a.

Based on the determined increment factors IFa, IFb and IFe, the queue counters Ca, Cb and Ce are respectively updated. For example, the new value of the queue counter Ca is equal to (0+1000)=1000. Similarly, the new value of the queue counter Cb is equal to 1500, and the new value of the queue counter Ce is equal to zero.

Subsequent to updating the queue counters Ca, Cb and Ce, during the DRR cycle (i), the queue counter Cb is at least as high as the head data packet size Pb. That is, the queue counter Cb is high enough to transmit head data packet Db1 from the queue B, whereas the queue counter Ca is still less than the head data packet size PSa. Accordingly, in the DRR cycle (i), the head data packet Db1 from the queue B is processed by the data processing module 36 of the packet processor 20. In response to processing the head data packet Db1, the queue counter Cb is updated by decrementing the queue counter Cb by the size of the head data packet Db1. Accordingly, the new value of the queue counter Cb is 0.

FIG. 2b illustrates the operation of the packet processing system 10 of FIG. 1 during DRR cycle (i−1)), where the DRR cycle (i+1)) occurs immediately subsequent to DRR cycle (i) of FIG. 2a. As previously discussed, during the DRR cycle (i), the head data packet Db1 is processed. Accordingly, in the DRR cycle (i+1), queue B includes data packet Db2 only, which is also the head data packet of the queue B. Furthermore, the size of the head data packet Db2 is 1100 (i.e., PSb=1100). Also, similar to FIG. 2a, for the DRR cycle (i+1), PSa=1500 and PSe=0.

Referring again to FIG. 2a, at the end of the DRR cycle (i), the queue counters Ca, Cb and Ce were equal to 1000, 0 and 0, respectively. At DRR cycle (i+1), MFa, MFb and MFe are determined using equation 1. For example, MFa=Ceiling ((PSa−Ca)/Wa)=Ceiling ((1500−1000)/100)=5. Also, MFb=Ceiling ((1100−0)/150)=8. As the queue E is empty, MF for queue E (i.e., MFe) is undefined. The MMF for the DRR cycle (i+1) is determined using equation 2, and the MMF is equal to the minimum of MFa and MFb. That is, for the DRR cycle (i+1), the MMF is equal to 5.

The increment factors IFa, IFb and IFe for the DRR cycle (i+1) are subsequently determined using equation 3. For example, for the DRR cycle (i+1), IFa=MMF×Wa=5× 100=500. Similarly, IFb is equal to 750 and IFe is equal to zero, as illustrated in FIG. 2b.

Based on the determined increment factors IFa, IFb and IFc, the queue counters Ca, Cb and Ce are respectively updated. For example, during the DRR cycle (i+1), the new value of the queue counter Ca is equal to (1000+500)=1500. Similarly, the new value of the queue counter Cb is equal to (0+750)=750, and the new value of the queue counter Ce is equal to zero.

Subsequent to updating the queue counters Ca, Cb and Ce during the DRR cycle (i−1), the queue counter Ca is at least as high as the head data packet size PSa (e.g., as illustrated in FIG. 2b, Ca is equal to PSa). That is, the queue counter Ca is high enough to transmit the head data packet Da1 from the queue A, whereas the queue counter Cb is still less than the head data packet size PSb. Accordingly, in the DRR cycle (i+1), the head data packet Da1 from the queue A is processed by the data processing module 36 of the packet processor 20. In response to processing the head data packet Da1, the queue counter Ca is updated by decrementing the queue counter Ca by the size of the head data packet Da1. Accordingly, the new value of the queue counter Ca is 0. Also, the queue counter Cb and Ce are 750 and 0, respectively, at the end of the DRR cycle (i+1).

Although in FIGS. 2a and 2b, no new data packets are illustrated to be queued in the queues A, B and E during the DRR cycles (i) and (i+1), in various other embodiments, one or more new data packets join one or more of the queues during, for example, DRR cycle (i+1). Furthermore, the various numbers (e.g., PSa, Ca, IFa, etc) associated with FIGS. 2a and 2b have appropriate units. The unit for these numbers is, for example, bytes. The MFs and the MMF are, for example, dimensionless numbers.

In a conventional deficit round robin packet processing system scheduler, the queue counters are incremented by queue weights only. Accordingly, in the conventional packet processing system, subsequent to DRR cycle (i−1), in the example above, at least fifteen more conventional DRR cycles would be required before the queue counter for the queue B reaches 1500. That is, at least fifteen conventional DRR cycles would be required before the queue counter Cb for the queue B is high enough for transmitting the head data packet Db1, thereby resulting in a waste of at least fourteen DRR cycles. In contrast, in the embodiments of FIG. 2a, by incrementing the queue counter Cb with the increment factor IFb, no DRR cycle is wasted in processing the head data packet Db1 (as there are no DRR cycles between the DRR cycle (i−1) and DRR cycle (i) in FIG. 2a). Also, as the minimum of all the MFs are taken into account (e.g., by calculating the MMF) while scheduling the processing of the head data packets, the order in which the head packets of various queues are to be processed are always maintained.

Similarly, in the conventional DRR packet processing scheduling system, subsequent to DRR cycle (i), at least five more conventional DRR cycles are required before the queue counter for the queue A reaches 1500. That is, at least five more conventional DRR cycles are required before the queue counter for the queue A is high enough for transmitting the head data packet Da1, thereby resulting in a waste of at least four DRR cycles. In contrast, in the embodiments of FIG. 2b, by incrementing the queue counter Ca with the increment factor IFa, no DRR cycle is wasted in processing the head data packet Da1 (as there are no DRR cycles between the DRR cycle (i) and DRR cycle (i+1) in FIG. 2b).

Accordingly, in various embodiments, the data processing system 10 of FIG. 1 is more efficient (e.g., results is relatively less latency, less processing time, no wasted DRR cycles, etc.) compared to a conventional data processing system.

Figure 3:
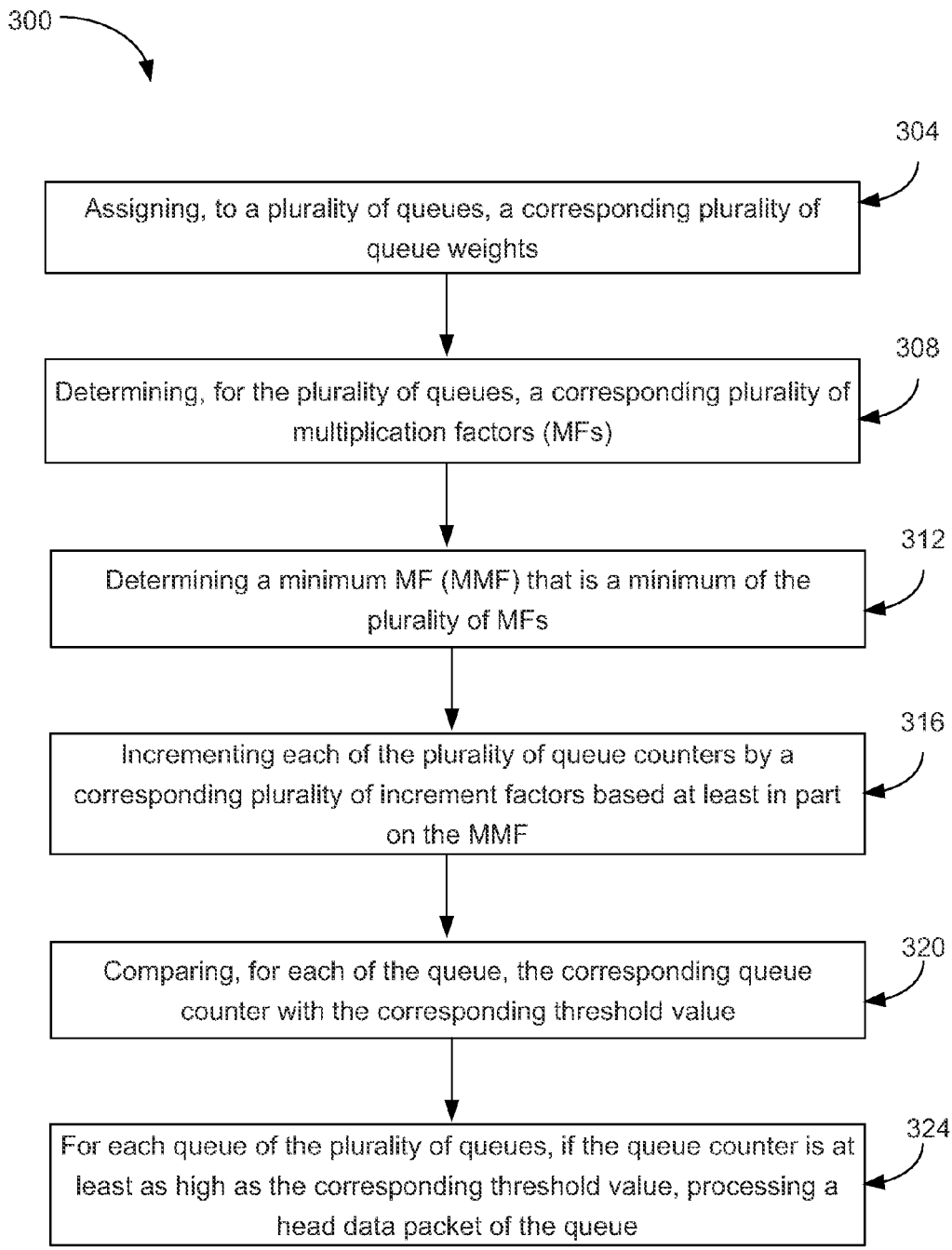
FIG. 3 illustrates an example method for operating the packet processing system of FIG. 1, in accordance with an embodiment of the present disclosure.

FIG. 3 illustrates an example method 300 for operating the packet processing system 10 of FIG. 1, in accordance with an embodiment of the present disclosure. At 304, the packet processor 20 (e.g., the weight assignment module 22) assigns, to a plurality of queues (e.g., queues A, . . . , E), a corresponding plurality of queue weights (e.g., queue weights Wa, . . . , We). In an embodiment, a queue weight of a queue is assigned based at least in part on a priority of the queue.

At 308, the packet processor 20 (e.g., queue multiplication factor module 32) determines (e.g., using equation 1), for the plurality of queues, a corresponding plurality of multiplication factors (e.g., MFa, . . . , MFe). In an embodiment, the MF of a queue represents a minimum number of DRR cycles required by the corresponding queue counter to reach a threshold value if the corresponding queue counter is incremented by the corresponding queue weight during each DRR cycle, where the threshold value of a queue is a size of a head data packet in the queue.

At 312, the packet processor 20 (e.g., queue multiplication factor module 32) determines (e.g., using equation 2) a minimum MF (MMF) that is a minimum of the plurality of MFs. At 316, the packet processor 20 (e.g., the queue counter module 28) increments each of the plurality of queue counters by a corresponding plurality of increment factors based at least in part on the MMF. In an embodiment, for each queue of the plurality of queues, the increment factor is a product of the MMF and the corresponding queue weight, and is determined using equation 3.

At 320, the packet processor 20 (e.g., the data processing module 36) compares, for each of the queue, the corresponding queue counter with the corresponding threshold value. At 324, for each queue of the plurality of queues, if the queue counter is at least as high as the corresponding threshold value, the packet processor 20 (e.g., the data processing module 36) processes a head data packet of the queue.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method for scheduling processing of packets received from a network, comprising:
assigning a corresponding queue weight to each of a plurality of queues that are configured to enqueue the packets for processing;
for each of the plurality of queues, determining a corresponding multiplication factor (MF) as a function of a number of cycles until a next packet is available from the corresponding queue for processing;
incrementing a plurality of counters, associated with the corresponding plurality of queues, based at least in part on the multiplication factors, wherein determining the MF further comprises
determining a MF of a queue such that the MF of the queue represents a minimum number of cycles required by the corresponding counter to reach a threshold value if the corresponding counter is incremented by the corresponding queue weight during each cycle;
scheduling processing of a packet of a queue of the plurality of queues, based at least in part on incrementing the plurality of counters; and
based on the scheduling, processing the packet of the queue of the plurality of queues.

2. The method of claim 1, wherein the cycles are round robin cycles.

3. A method for scheduling processing of packets received from a network, comprising:
assigning a corresponding queue weight to each of a plurality of queues that are configured to enqueue the packets for processing;
for each of the plurality of queues, determining a corresponding multiplication factor (MF) as a function of a number of cycles until a next packet is available from the corresponding queue for processing;
incrementing a plurality of counters, associated with the corresponding plurality of queues, based at least in part on the multiplication factors;
scheduling processing of a packet of a queue of the plurality of queues, based at least in part on incrementing the plurality of counters; and
based on scheduling processing of a packet of a queue of the plurality of queues, processing the packet of the queue of the plurality of queues,
wherein the plurality of queues comprises M number of queues, where M is an integer, and wherein determining the MF further comprises:
determining a multiplication factor $MF_i$ of an ith queue (where i is an integer) such that $MF_i = \text{Ceiling}((PS_i - C_i)/W_i)$, wherein $PS_i$ is a size of a head packet of the ith queue, $C_i$ is the corresponding counter, $W_i$ is the corresponding queue weight, and wherein the function Ceiling(L) of a number L represents the smallest integer that is not smaller than L.

4. The method of claim 1, wherein said scheduling processing of the packet further comprises:

in response to incrementing the plurality of counters, comparing, for each of the plurality of queues, the corresponding counter with the corresponding threshold value; and for a queue of the plurality of queues, if the corresponding counter is at least as high as the corresponding threshold value, scheduling processing of a head packet of the queue.

5. The method of claim 2, wherein the threshold value of a queue is a size of a head packet in the queue.

6. A method for scheduling processing of packets received from a network, comprising:
assigning a corresponding queue weight to each of a plurality of queues that are configured to enqueue the packets for processing;
for each of the plurality of queues, determining a corresponding multiplication factor (MF) as a function of a number of cycles until a next packet is available from the corresponding queue for processing;
incrementing a plurality of counters, associated with the corresponding plurality of queues, based at least in part on the multiplication factors;
scheduling processing of a packet of a queue of the plurality of queues, based at least in part on incrementing the plurality of counters; and
based on scheduling processing of a packet of a queue of the plurality of queues, processing the packet of the queue of the plurality of queues,
wherein incrementing the plurality of counters further comprises:
determining a minimum MF (MMF) that is a minimum of the MFs of the plurality of queues; and
incrementing each of the plurality of counters by a corresponding plurality of increment factors such that for each queue of the plurality of queues, the increment factor is a product of the MMF and the corresponding queue weight.

7. The method of claim 1, wherein assigning the plurality of queue weights further comprises:
assigning, to each queue, the corresponding queue weight based at least in part on a priority of the queue.

8. A system-on-chip (SOC) comprising:
a plurality of client devices associated with a corresponding plurality of queues, wherein the plurality of queues is assigned a corresponding plurality of counters; and
a packet processor comprising:
a weight assignment module configured to assign, to the plurality of queues, a corresponding plurality of queue weights;
a queue multiplication factor module configured to determine, for the plurality of queues, a corresponding plurality of multiplication factors (MFs), wherein a MF of a queue is a function of a number of cycles until a next packet is available from the corresponding queue for processing, wherein the queue multiplication factor module is further configured to determine the plurality of MFs such that a MF of a queue represents a minimum number of cycles required by the corresponding queue counter to reach a threshold value if the corresponding counter is incremented by the corresponding queue weight during each cycle; and
a queue counter module configured to increment each of the plurality of counters based at least in part on the plurality of MFs.

9. The SOC of claim 8, wherein the cycles are round robin cycles.

10. A system-on-chip (SOC) comprising:
a plurality of client devices associated with a corresponding plurality of queues, wherein the plurality of queues is assigned a corresponding plurality of counters; and
a packet processor comprising:
a weight assignment module configured to assign, to the plurality of queues, a corresponding plurality of queue weights;
a queue multiplication factor module configured to determine, for the plurality of queues, a corresponding plurality of multiplication factors (MFs), wherein a MF of a queue is a function of a number of cycles until a next packet is available from the corresponding queue for processing; and
a queue counter module configured to increment each of the plurality of counters based at least in part on the plurality of MFs,
wherein the queue multiplication factor module is further configured to determine the plurality of MFs such that a multiplication factor $MF_i$ of an ith queue (where i is an integer) is given by $MF_i = \text{Ceiling}((PS_i - C_i)/W_i)$, wherein $PS_i$ is a size of a head packet of the ith queue, $C_i$ is the corresponding counter, $W_i$ is the corresponding queue weight, and wherein the function $\text{Ceiling}(L)$ of a number L represents the smallest integer that is not smaller than L.

11. The SOC of claim 8, further comprising:
a scheduling module configured to:
in response to incrementing each of the plurality of counters, compare, for each of the plurality of queues, the corresponding counter with the corresponding threshold value; and
for each of the plurality of queues, if the counter is at least as high as the corresponding threshold value, schedule processing of a head packet of the queue; and
a data processing module configured to process the scheduled head packet of the queue.

12. The SOC of claim 8, wherein the threshold value of a queue is a size of a head packet in the queue.

13. The SOC of claim 8, wherein:
a minimum MF (MMF) is a minimum of the MFs of the plurality of queues; and
the queue counter module is further configured to increment each of the plurality of counters by a corresponding plurality of increment factors such that for each queue of the plurality of queues, the increment factor is a product of the MMF and the corresponding queue weight.

14. The SOC of claim 8, wherein the weight assignment module is further configured to assign, to each queue, the corresponding queue weight based at least in part on a priority of the queue.

15. The SOC of claim 8, wherein the plurality of client devices comprises one or more processing cores and one or more network interfaces.

* * * * *